United States Patent
Glavinic et al.

(10) Patent No.: US 12,257,868 B2
(45) Date of Patent: Mar. 25, 2025

(54) PLUG-IN CONNECTOR FOR TRANSMITTING DATA BETWEEN COUPLED VEHICLES, AND SYSTEM AND VEHICLE THEREWITH

(71) Applicant: ZF CV Systems Hannover GmbH, Hannover (DE)

(72) Inventors: Andelko Glavinic, Sarstedt (DE); Andreas Goers, Pattensen (DE)

(73) Assignee: ZF CV Systems Europe BV, Brussels (BE)

( * ) Notice: Subject to any disclaimer, the term of this patent is extended or adjusted under 35 U.S.C. 154(b) by 966 days.

(21) Appl. No.: 17/299,548

(22) PCT Filed: Dec. 6, 2019

(86) PCT No.: PCT/EP2019/084016
§ 371 (c)(1),
(2) Date: Jun. 3, 2021

(87) PCT Pub. No.: WO2020/126556
PCT Pub. Date: Jun. 25, 2020

(65) Prior Publication Data
US 2022/0055432 A1    Feb. 24, 2022

(30) Foreign Application Priority Data
Dec. 19, 2018  (DE) ............ 10 2018 132 867.2

(51) Int. Cl.
*B60D 1/64* (2006.01)
*H01R 13/66* (2006.01)

(52) U.S. Cl.
CPC ............ *B60D 1/64* (2013.01); *H01R 13/665* (2013.01); *H01R 2201/26* (2013.01)

(58) Field of Classification Search
CPC ... B60D 1/58; B60D 1/62; B60D 1/64; H01R 13/66; H01R 13/665; H01R 13/6658; H01R 2201/26
(Continued)

(56) References Cited

U.S. PATENT DOCUMENTS 5,385,476 A   1/1995  Jasper
5,739,592 A   4/1998  Rigsby et al.
(Continued)

FOREIGN PATENT DOCUMENTS

AU   6435696 A    3/1997
CN   101051721 A  10/2007
(Continued)

OTHER PUBLICATIONS

European Patent Office, Rijswijk, Netherlands, International Search Report of International Application No. PCT/EP2019/084016, Mailed May 8, 2020, 4 pages.
(Continued)

*Primary Examiner* — Khiem M Nguyen
(74) *Attorney, Agent, or Firm* — Dickinson Wright PLLC (57) ABSTRACT

A plug-in connector device for a vehicle for transmitting data includes a first interface for connection to a vehicle and a second interface for connection to a connecting line, wherein the first interface and/or the second interface is/are formed as a connecting element, in particular formed as a plug or a socket, for establishing a connection according to an industry standard. A data interface for connection to a data line is electrically connected to the first interface in order to transmit electrical signals and/or data between the data interface and the second interface. The first interface is electrically connected to the second interface to transmit electrical signals and/or data between the first interface and the second interface. A connecting line is configured for
(Continued)

connection to a second interface of the plug-in connector device. A vehicle includes a system having the plug-in connector device, and a vehicle has such a system.

18 Claims, 7 Drawing Sheets

(58) Field of Classification Search
 USPC .......................................................... 439/35
 See application file for complete search history.

(56) References Cited

U.S. PATENT DOCUMENTS

| | | | |
|---|---|---|---|
| 6,483,200 | B1 | 11/2002 | Jacobs |
| 2006/0085099 | A1 | 4/2006 | Burlak et al. |
| 2007/0241868 | A1 | 10/2007 | Fackrell et al. |
| 2012/0064739 | A1 | 3/2012 | Sell |
| 2017/0187472 | A1 | 6/2017 | Chini et al. |
| 2022/0055432 | A1* | 2/2022 | Glavinic .................. B60D 1/64 |

FOREIGN PATENT DOCUMENTS

| | | |
|---|---|---|
| CN | 102723645 A | 10/2012 |
| CN | 106215432 A | 12/2016 |
| DE | 10161709 A1 | 6/2003 |
| DE | 102015206047 A1 | 10/2016 |
| EP | 0546370 A1 | 6/1993 |
| EP | 1702802 A1 | 9/2006 |
| GB | 2383476 A | 6/2003 |
| WO | 9326062 A1 | 12/1993 |
| WO | 2013043661 A1 | 3/2013 |
| WO | 2018069326 A2 | 4/2018 |
| WO | 2018104929 A1 | 6/2018 |

OTHER PUBLICATIONS

Peter Hank et al., "Automotive Ethernet: In-Vehicle Networking and Smart Mobility," Design, Automation & Test in Europe Conference & Exhibition, 2013, IEEE, Mar. 18, 2013, pp. 1735-1739, DOI: 10.7873/DATE.2013.349, ISBN: 978-1-4673-5071-6. XP032396000.

* cited by examiner

PLUG-IN CONNECTOR FOR TRANSMITTING DATA BETWEEN COUPLED VEHICLES, AND SYSTEM AND VEHICLE THEREWITH

TECHNICAL FIELD

The invention relates to the field of vehicles, in particular commercial vehicles, and specifically to the transmission of data and electrical signals between a vehicle formed as a towing vehicle and a vehicle which is towed by the towing vehicle and is formed as a vehicle trailer.

BACKGROUND

In the field of vehicles and, in particular, commercial vehicles, specifically towing vehicles and vehicle trailers, it is known practice to interchange data and signals between a towing vehicle and a vehicle trailer via two standardized electrical connections. For this purpose, a first electrical connection is provided between the towing vehicle and the vehicle trailer according to the ISO 7638 standard and is used solely for brake and chassis control. There is also a second electrical connection between a towing vehicle and a vehicle trailer towed by the towing vehicle according to the ISO 12098 standard. The second electrical connection is used for light control and all other control operations apart from braking and chassis control operations.

The towing vehicle and the vehicle trailer each have, for the electrical connections, a connecting element which is usually formed as a socket. The connecting elements of a towing vehicle and of a vehicle trailer towed by the towing vehicle are then connected, via a connecting line, to two connecting elements which are usually formed as plug-in connectors or plugs. The connecting line is usually formed as a spiral cable. The plugs of the spiral cable are therefore preferably respectively inserted into a socket of the towing vehicle and a socket of the vehicle trailer.

In addition to these standardized electrical connections between a towing vehicle and a vehicle trailer, there is an increasing desire to provide a further connection for transmitting data signals with a high bandwidth. This bandwidth is needed, for example, to transmit real-time data from sensors or cameras, for example, between a towing vehicle and a vehicle trailer. As an example, reference may be made to data from a camera at the end of the vehicle trailer which are intended to be transmitted to a towing vehicle, for example in real time, in order to assist the driver during reversing. Furthermore, it would also be possible to take into account lidar or radar data which are recorded using the sensors in the vehicle trailer, advantageously for the purpose of controlling a vehicle combination by an operator, who can also be referred to as the vehicle driver of the towing vehicle, if the data are transmitted to the towing vehicle. Therefore, there is generally the desire to transmit data for driver assistance systems, which are also called Advanced Driver Assistance Systems (ADAS), and autonomous driving, which is also called Automated Driving (AD), at high data rates between a vehicle trailer and a vehicle.

The solution for transmitting such data at a high data rate between a towing vehicle and a vehicle trailer is to establish a further, additional electrical connection between the towing vehicle and the vehicle trailer. This has also already been attempted, but this solution has turned out to be impractical. This is because the effort needed when coupling and uncoupling the vehicle trailers is increased further by virtue of an additional, third electrical connection between the towing vehicle and the vehicle trailer. In addition, an additional spiral cable must be carried in the towing vehicle in the uncoupled state of the towing vehicle in order to be able to establish such a further electrical connection at any time.

Therefore, a search was carried out for further solutions for interchanging the data between a towing vehicle and a vehicle trailer, for example via wireless connections. This solution could not become established either since the trust in wireless connections is usually insufficient, in particular if safety-relevant data for transmission are involved. This applies, in particular, if the wireless connection is used for autonomous driving.

SUMMARY

The object of the present invention is therefore to provide a possibility for transmitting data between vehicles, in particular a towing vehicle and a vehicle trailer, which provides a sufficiently high data rate, is wired and presupposes little effort during coupling and uncoupling.

In this respect, the invention relates to a plug-in connector device for a vehicle, in particular a towing vehicle or a vehicle trailer, for transmitting data between the vehicle and a vehicle coupled to the vehicle. The plug-in connector device comprises a first interface for connection to a vehicle and a second interface for connection to a connecting line. The first interface or the second interface or the first interface and the second interface is/are formed as connecting elements for establishing a connection according to an ISO (International Organization for Standardization) or an SAE (Society of Automotive Engineers) standard, particularly preferably according to ISO 7638 or ISO 12098. A connecting element here denotes a connecting element for establishing a plug-in connection and therefore corresponds to either a plug or a socket.

The plug-in connector device also comprises a data interface for connection to a data line of the vehicle. The plug-in connector device is also configured to output data or electrical signals received via the data interface using the second interface or to output data or electrical signals received via the second interface at the data interface and to likewise output electrical signals and/or data received via the first interface at the second data interface. For this purpose, the second interface is electrically connected, on the one hand, to the first interface and, on the other hand, to the data interface. Electrically connected also comprises here a connection which is not direct, but rather is also established via electrical engineering components.

The plug-in connector device is therefore constructed, for example, such that the first interface is formed as a connecting element, for example formed as a plug, according to an ISO or SAE standard, for example according to ISO 7638 or ISO 12098. The first interface, that is to say the plug, can then be inserted, for example, into a socket which is present on a vehicle and is standardized according to an ISO or SAE standard, in particular according to ISO 7638 or ISO 12098, and then provides a data interface and the second interface. The second interface can then be formed as an individual interface with any desired number of electrical lines and transmits, on the one hand, the data or signals from the first interface and, on the other hand, data and signals which are additionally provided via the data interface. In this case, the data interface is an interface for connecting a module or a control unit which can emit or receive data at a high data transmission rate. If a second plug-in connector device is arranged in a coupling of a further vehicle that is standardized according to an ISO or SAE standard, in particular according to ISO 7638 or ISO 12098, the two vehicles, wherein one is formed as a towing vehicle and the other is formed as a vehicle trailer, can still interchange the signals prescribed according to the ISO or SAE standard, in particular according to the ISO 7638 or ISO 12098 standard, and additionally data via their second interfaces which are connected via a single connecting line. For this purpose, the plug-in connector device is preferably formed as an adapter which can be easily removed from the connecting element on the vehicle if there is no desire to transmit data at a high data speed.

An electrical connection according to an ISO or SAE standard, in particular according to ISO 7638 or ISO 12098, is therefore expanded in order to establish the standardized connection, on the one hand, and to transmit data at a high data transmission rate via the same electrical connection, on the other hand. Only an adapted cable for connecting the second interfaces of two plug-in connector devices is required for this purpose. Therefore, it is possible to dispense with an additional electrical connection and a wireless connection for transmitting data at high data rates.

Furthermore, according to the above example, if one of the two vehicles does not support transmission of data at a fast data rate, the plug-in connector device can be easily removed from the standardized socket of the vehicle which supports fast data transmission, and a conventional standardized connection can be established. Compatibility even with vehicles which do not support a fast data connection is therefore still ensured. It has been recognized that precisely this compatibility which is still supported actually makes it possible to expand the ISO standardized connections.

According to a first embodiment, the first interface comprises a plurality of first contacts, the second interface comprises a plurality of second contacts and the data interface comprises a plurality of third contacts. The plug-in connector device also comprises at least one branching element. The branching element comprises a connecting point, at least two filter elements and preferably a further filter device. One of the first contacts is electrically connected to the first connecting point of the branching element and two of the second contacts are also each electrically connected to the connecting point via one of the filter elements. Two of the third contacts are also each connected to one of the two second contacts, preferably via a further filter device.

The filter elements and preferably the further filter device make it possible for only data and signals which are received via the second contacts of the second interface connected to the branching element and are transmitted for the corresponding interface to be output at the first interface or the data interface. The data interface can therefore directly output data received via the two second contacts for further processing, wherein signals intended for the first interface are suppressed by the further filter device. At the same time, the electrical signals transmitted via the second contacts are filtered via the filter elements and are then supplied to one of the first contacts of the first interface. The filters are preferably constructed to filter out that portion of the electrical signals which corresponds to the data intended to be output at the data interface. The filter elements are formed as low-pass filters and the further filter device is formed as a high-pass filter, for example.

Therefore, a signal free of the components of the electrical signals which are used to transmit data can be output at the first interface. If, for example, the signal received via the two contacts of the second interface is an indicator signal, onto which data have been modulated, these data components are filtered out in order to then output a signal which is free of the modulated data signal components at the first contact of the first interface. If an indicator is therefore controlled thereby according to this example, flickering of the indicator is avoided. In addition, according to this embodiment, a signal from the first interface is therefore divided between two lines via the branching element and is output via the two contacts of the second interface. These two lines can then be additionally used to transmit data in order to transmit data at a high data transmission rate via the data interface and these two lines, for example. This is possible, for example, since a suitable line code, for example according to the Manchester code, can be transmitted in this manner. If two plug-in connector devices are therefore respectively used on one of two vehicles which are coupled to one another, the signal emitted by the vehicle via the first interface of one plug-in connector device can be initially split via the branching element and, after transmission via the second plug-in connector device, can be combined again via the branching element of the latter in order to then be output at a first interface of the second plug-in connector device. This additionally makes it possible to provide the second contacts of the second interface, on the one hand, but also the transmission lines connected to the second interface with a comparatively smaller cross section than that provided for transmitting an electrical signal according to an ISO or SAE standard, in particular according to ISO 7638 or ISO 12098. This is because the signal emitted and received via the first contact of the first interface is transmitted in a parallel manner on two lines, the lines connected to the second interface(s) of the two plug-in connector devices, with the result that the prescribed cross section is composed of these two lines.

According to a further embodiment, the plug-in connector element comprises at least two branching elements. As a result, at least two first contacts are then also each connected to two second contacts which then likewise also provide third contacts of the data interface. Data can thus be transmitted in a redundant manner, for example, or a data rate can be increased even further. Data security and/or the data transmission speed is/are therefore improved.

According to a further embodiment, the first interface is formed as a connecting element for establishing a plug-in connection according to an ISO or SAE standard, in particular according to ISO 7638 or ISO 12098. The connecting element is preferably a standardized ISO or SAE plug, for example an ISO 7638 or ISO 12098 plug, which is configured to be inserted into a standardized ISO or SAE socket, for example an ISO 7638 or ISO 12098 socket, which is present on a vehicle. The plug-in connector device is therefore formed as an adapter which can be inserted into the vehicle, specifically into the socket provided according to the standard. The second interface is preferably formed as a proprietary connecting element. A proprietary connecting element here denotes a plug or a socket which need not be standardized according to ISO or SAE standards. This design as a type of adapter therefore enables data transmission and transmission according to standards, for instance ISO 7638 and ISO 12098, if the vehicles which are coupled to one another, specifically a towing vehicle and a vehicle trailer for example, provide data transmission. This is the case if, for example, a trailer vehicle is equipped with a reversing camera which can transmit data to the towing vehicle for display or evaluation. If one of the two vehicles is not constructed to transmit such data, whether the vehicle trailer does not provide any data for transmission, on the one hand, or the towing vehicle does not provide any device for evaluating the data, on the other hand, the plug-in connector device can be easily removed from the standardized socket, with the result that a conventional connecting cable, for example a spiral cable, can transmit the accordingly prescribed signals according to a standard, for instance the ISO 7638 or ISO 12098 standard. Compatibility with vehicles which are not equipped for fast data transmission is therefore possible, on the one hand, but fast data transmission is possible, on the other hand, by inserting or connecting an individual plug if both vehicles which are coupled to one another provide this functionality.

According to a further embodiment, the first contacts of the first interface are formed as solder contacts for permanent connection to electrical lines of a vehicle, in particular to the contacts of a cable of a vehicle which comprises the lines. The second interface is then formed as a connecting element, that is to say formed as a plug or a socket, for establishing a connection according to an ISO or SAE standard, preferably ISO 7638 or ISO 12098. In this case, as an alternative to the previous embodiment, the plug-in connector device is not provided formed as an adapter, but rather replaces the existing connecting element on the vehicle, that is to say the socket, according to an ISO or SAE standard, preferably ISO 7638 or ISO 12098. This can therefore be permanently connected to a vehicle via the solder contacts for use. Nevertheless, the second interface is formed as a connecting element for establishing a connection according to an ISO or SAE standard, preferably ISO 7638 or ISO 12098, in order to still ensure backwards compatibility with vehicles without a function for fast data transmission via a conventional spiral cable according to an ISO or SAE standard, preferably ISO 7638 or ISO 12098.

According to one development of the embodiment mentioned last, the second interface has at least one second contact which, in the connecting element according to an ISO or SAE standard, preferably ISO 7638 or ISO 12098, has a position which differs from the positions of the contacts prescribed according to the ISO or SAE standard, preferably ISO 7638 or ISO 12098. In this case, the further second contact is arranged in such a manner that the contacts prescribed according to an ISO or SAE standard, preferably ISO 7638 or ISO 12098, remain unaffected by the at least one further second contact. It is therefore possible, on the one hand, to connect the second interface to a plug of a standardized spiral cable, in particular according to ISO 7638 or ISO 12098, but, on the other hand, a special cable can be used to additionally transmit data via the further contact and at least one of the contacts standardized according to ISO or SAE. A simple implementation for fast data transmission with backwards compatibility which is still ensured is therefore possible.

As an alternative or in addition to the last embodiment, the second contacts of the second interface are formed as contact areas in contact sockets or formed as contact pins. At least one of the contact sockets or at least one of the contact pins has two electrically isolated contact areas, wherein each of the contact areas forms one of the second contacts. A standardized connecting element, preferably according to ISO 7638 or ISO 12098, in particular formed as a socket, can therefore be provided with the second interface, into which connecting element conventional standardized connecting elements, preferably according to ISO 7638 or ISO 12098, preferably plugs, can be inserted in order to provide the standardized functions. In this case, the two electrically isolated contact areas in the at least one contact socket are easily bridged via a standardized contact pin of a standardized plug, preferably according to ISO 7638 or ISO 12098, with the result that it is not possible to transmit data. However, a specially adapted cable which also has a contact pin with two electrically isolated contact areas can be used to provide an additional electrical line in order to thus transmit data at a high data rate. Data transmission, if desired, can therefore be carried out using a plug-in connector device constructed in this manner, in which case this plug-in connector device also remains compatible for use with the known standardized spiral cables without then providing the data transmission function.

According to a further embodiment, the third contacts are formed as solder contacts for the permanent connection of electrical lines, specifically to contacts of the lines which are combined in a cable of a vehicle. A secure data connection to the plug-in connector device is therefore ensured.

The invention also relates to a plug-in connector device comprising a connecting element, specifically a plug or a socket. The connecting element also comprises a plurality of contact sockets, in particular if it is formed as a socket, and/or a plurality of contact pins, in particular if it is formed as a plug. According to a special embodiment, it is therefore also possible for the connecting element to have a plurality of contact sockets and a plurality of contact pins together.

In this case, the contact sockets are constructed in such a manner that they each have a receiving region for receiving a contact pin, wherein at least one of the contact sockets has at least two electrically isolated contact areas. The plurality of contact pins are constructed in such a manner that they each have an insertion region for insertion into a receiving region of a contact socket. In addition, at least one of the contact pins is constructed in such a manner that it has at least two electrically isolated contact areas.

Sharing the contact areas of a contact socket or of a contact pin makes it possible to provide two or more contacts which, together with accordingly isolated contact areas of a complementary connecting element, are used to establish two electrically isolated electrical connections via the plug-in connector device. A complementary connecting element can likewise also be connected to only one contact area, with the result that a simple electrical connection can then at least still be established. In the last-mentioned case, the electrically isolated contact areas are short-circuited.

According to a further embodiment, the connecting element has a plurality of contact sockets, wherein the receiving region of the contact sockets is cylindrical with an inner lateral surface. The electrically isolated contact areas of the at least one contact socket are then formed by at least two partial lateral surfaces which are beside one another in the circumferential direction of the inner lateral surface. Accordingly, the inner lateral surface is, for example, formed as a metal conductor which, in order to form two isolated contact areas for example, is interrupted twice along a line parallel to a cylinder longitudinal axis of the cylindrical lateral surface. The two electrically isolated contact areas are therefore each formed by partial lateral surfaces which are beside one another and each correspond to half a lateral surface according to the last-mentioned example.

Alternatively or additionally, the connecting element comprises a plurality of contact pins, wherein the insertion region of the contact pins is likewise cylindrical with an outer lateral surface. The electrically isolated contact areas of the at least one contact pin are then formed by at least two partial lateral surfaces which are beside one another in the circumferential direction of the outer lateral surface.

A secure connection can also be established during operation, that is to say under voltage, and polarity reversal protection is provided at the same time by the presence of a plurality of contact sockets and contact pins, the arrangement of which predefines a plug orientation, since standardized plugs or prepared plugs and sockets, in particular, can only be connected to one another in intended orientations.

According to a further embodiment of the plug-in connector device having a connecting element, comprising a plurality of contact sockets and/or contact pins, the plug-in connector device additionally has the features of one of the embodiments mentioned above, in particular.

The invention also relates to a connecting line having at least one plug for connection to a second interface, formed as a connecting element, of a plug-in connector device according to one of the embodiments mentioned above. The connecting line comprises a plurality of electrical conductors, wherein at least one pair of electrical conductors is twisted. Standardized signals, in particular according to ISO 7638 or ISO 12098, can therefore be transmitted via the connecting line, wherein data can be additionally transmitted at a high data speed via the twisted conductors.

According to a further embodiment, the pair of twisted lines corresponds to the Open Alliance BroadR-Reach (O-ABR) standard.

According to a further embodiment, the pair of twisted conductors has electrical conductors, for example copper litz wires, having a smaller cross section than the conductors of the untwisted lines, in particular substantially half the cross section. In this case, use is made of the knowledge that data signals are transmitted via the twisted lines which, on account of their electrical requirements, require only smaller cross sections, wherein, if a higher electrical energy must be transmitted via these twisted lines, for example in order to control lighting, the twisted lines are connected in parallel anyway in order to transmit the corresponding energy. A comparatively more favorable connecting line, through saving conductor material, is therefore possible and twisting of thinner conductors is easier and the connecting line can therefore be produced more easily.

According to a further embodiment, the connecting line has at least one connecting element for establishing a connection according to an ISO or SAE standard, in particular according to ISO 7638 or ISO 12098. The connecting element is preferably formed as a plug. In addition, each electrical conductor of the connecting conductors is connected to a contact. The connecting element is also formed as a plug having contact pins, which can also be called pins, wherein the electrical conductors of the twisted pair of conductors are connected to two isolated contact areas of a single pin, wherein the remaining conductors of the connecting line are each connected to an individual contact pin.

The connecting line is therefore configured to transmit data and also serves to be connected to conventional standardized connecting elements, for example according to ISO 7638 or ISO 12098, which are provided, in particular sockets.

The invention also comprises a system having a plug-in connector device according to one of the embodiments mentioned above and a control unit having an interface, wherein the interface of the control unit is connected to the data interface of the plug-in connector device, and the control unit is preferably a control unit of a sensor unit, in particular a camera, a lidar or a radar, or an evaluation unit, in particular an evaluation unit for sensor data, preferably camera, lidar or radar data.

The invention also relates to a vehicle having the system mentioned above or at least one plug-in connector device according to one of the embodiments mentioned above.

The invention also relates to a method for transmitting data between vehicles which are coupled to one another, in particular a towing vehicle and a vehicle trailer. In this case, data are first of all provided at a data interface of a plug-in connector device according to one of the embodiments mentioned above. The provided data are then emitted at the second interface of the plug-in connector device. The emitted data are received at a second interface of a further plug-in connector device according to one of the embodiments mentioned above, and the received data are provided at the data interface of the further plug-in connector device.

Further embodiments emerge from the exemplary embodiments explained in more detail in the drawings.

DETAILED DESCRIPTION OF THE DRAWINGS

Figure 1:
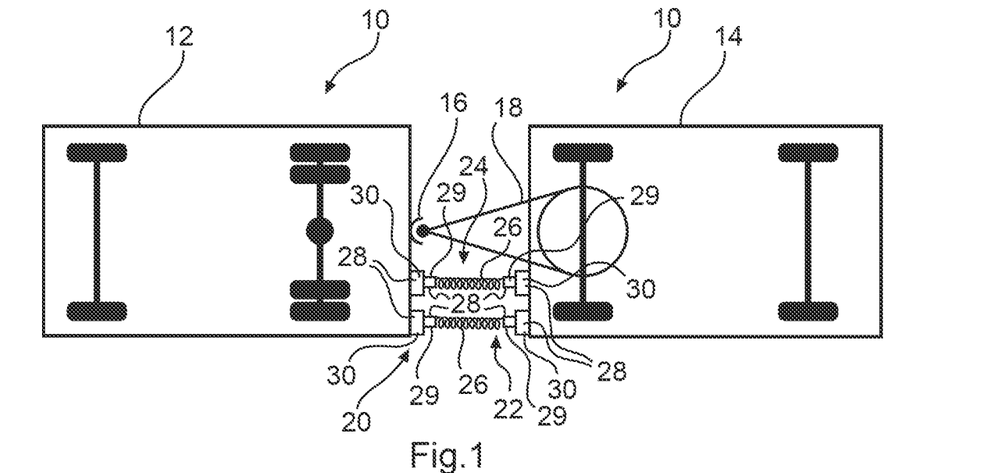
FIG. 1 shows vehicles which are coupled to one another.

FIG. 1 shows two vehicles 10 which are coupled to one another, specifically a vehicle combination comprising two vehicles 10, wherein one of the vehicles 10 is a towing vehicle 12 and the other vehicle 10 is a vehicle trailer 14. The vehicles 10 are coupled to one another via a trailer coupling 16 of the towing vehicle 12 and a drawbar 18 of the vehicle trailer 14. The towing vehicle 12 has a drive which is not illustrated in order to drive itself and therefore tow the vehicle trailer 14.

The two vehicles 10 are also connected to one another via two electrical connections 20. The electrical connections 20 correspond to a connection 22 according to ISO 7638 and a connection 24 according to ISO 12098. The connection 24 according to ISO 12098 is used to transmit electrical signals 81 for controlling the lighting of the vehicle trailer 14 and the connection 22 is used to interchange signals 81 for controlling braking. Both electrical connections 22, 24 each have a connecting line 26 which respectively comprises, at both ends, connecting elements 28 which are each formed as a plug 29, for example. The connecting lines 26 are formed as spiral cables, for example. The connecting line 26 for establishing the connection 24 therefore has connecting elements 28 according to ISO 12098 and the connecting line 26 for establishing the connection 22 has connecting elements 28 according to ISO 7638. The connecting elements 28 of the spiral cables 26 are each inserted into complementary connecting elements 28 on the vehicles 10. The complementary connecting elements 28 on the vehicles 10 therefore correspond here to sockets 30. Accordingly, the sockets 30 of the connection 22 are also constructed according to ISO 7638 and the sockets 30 of the connection 24 are constructed according to ISO 12098.

FIG. 1 shows a coupling of two vehicles 10 via a trailer coupling 16 and a drawbar 18 and the electrical connections 20 according to the prior art.

Figure 2:
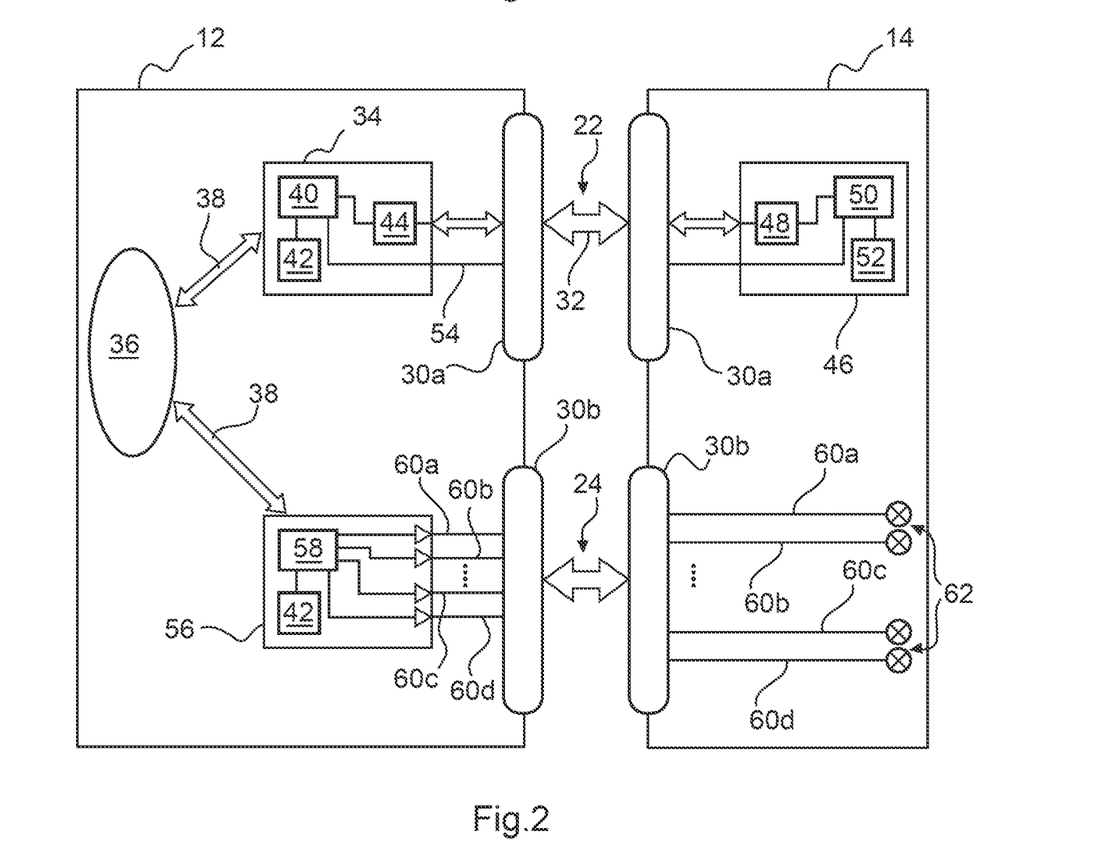
FIG. 2 shows connections according to ISO 7638 and ISO 12098 according to the prior art.

FIG. 2 shows an exemplary illustration of the towing vehicle 12 and of the vehicle trailer 14 with a detailed illustration of the two electrical connections 20. FIG. 2 likewise illustrates the prior art. The towing vehicle 12 comprises a socket 30*a* for establishing a connection 22 according to ISO 7638. The vehicle trailer 14 also comprises such a socket 30*a*. The two sockets 30*a* are connected to two plugs 29 via a connecting line 26 formed as a spiral cable, wherein this connecting line 26 is illustrated merely by way of example by the double-headed arrow 32 for better clarity. The socket 30*a* of the towing vehicle 12 is connected to a braking control unit 34. The braking control unit 34 receives, from a driver 36 of the towing vehicle 12, request signals 38 which request, for example, braking formed as a braking request from the driver 36. Brakes of the towing vehicle 12 are then controlled by the braking control unit 34 via a controller 40. In order to control the brakes which are not illustrated, the controller 40 takes into account, for example, additional information relating to the towing vehicle 12 which is received via a vehicle CAN interface 42 and is supplied to the controller 40.

The controller 40 is also configured to take into account sensor signals or information from the vehicle trailer 14. For this purpose, the braking control unit 34 has an ISO-CAN interface 44 which is standardized according to ISO 11992, for example. The controller 40 of the braking control unit 34 cannot only receive sensor signals or information from the vehicle trailer 14 via this interface 44, but can also transmit control commands to a trailer braking control unit 46. This is carried out by virtue of the ISO-CAN interface 44 of the towing vehicle 12 interchanging data 79 with an ISO-CAN interface 48 of the trailer braking control unit 46 via the connection 22. In the vehicle trailer 14, the data 79 for the ISO-CAN interface 48 are provided or received using a controller 50 of the trailer braking control unit. Further information from the vehicle trailer 14, for example wear, temperature of the brakes and air pressure of the wheels of the trailer 14, can be supplied to the controller 50 of the trailer braking control unit 46 via a trailer CAN interface 52 and can likewise be made available to the braking control unit 34 of the towing vehicle 12 via the connection 22.

A voltage supply for the trailer braking control unit 46 is also provided by the braking control unit 34 of the towing vehicle 12 via a further line 54.

Furthermore, the electrical connection 24 according to ISO 12098 is also illustrated. Accordingly, the towing vehicle 12 and the vehicle trailer 14 each have a socket 30*b* according to ISO 12098. Request signals 38, for example a request to switch on lighting, which are generated by the driver 36 are transmitted to a light controller 56 via the electrical connection 24 according to ISO 12098. The light controller 56 likewise has a controller 58 which is connected to a CAN bus of the towing vehicle 12 via a vehicle CAN interface 42. Electrical signals 81 are transmitted using the controller 58 of the light controller 56 via the electrical lines 60*a*-60*d* and then directly control the lighting 62 of the vehicle trailer 14, via the electrical connection 24, depending on the request signal 38 from the driver 36. The lighting 62 can also be controlled by requests received via the vehicle CAN interface 42. Accordingly, the electrical lines 60*a*-60*d* in the towing vehicle 12 and in the vehicle trailer 14 are each connected via the connection 24.

Figure 3:
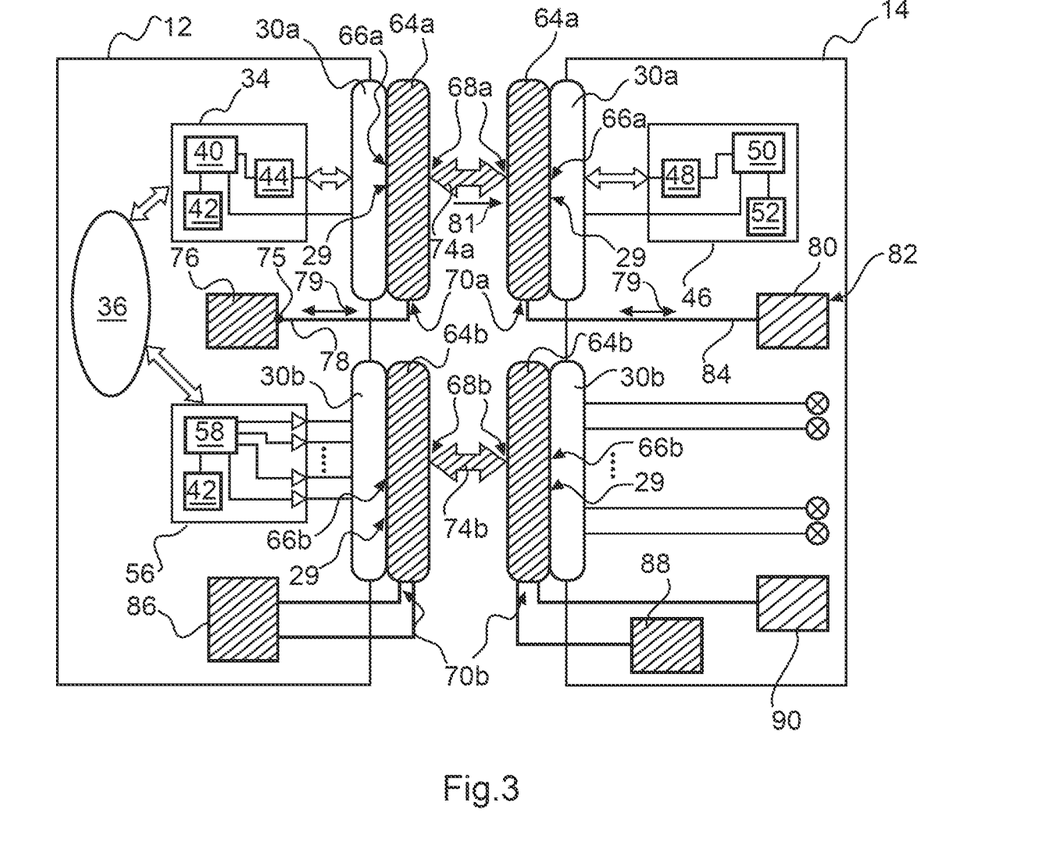
FIGS. 3, 4, 5, and 6 show exemplary embodiments of the plug-in connector device which are arranged on vehicles.

FIG. 3 shows plug-in connector devices 64*a*, 64*b* according to one exemplary embodiment of the invention. The plug-in connector devices 64*a* each have a first interface 66*a* and a second interface 68*a*. The plug-in connector devices 64*a* also have a data interface 70*a*. The first interfaces 66*a* of the plug-in connector devices 64*a* are formed as connecting elements 72*a* according to ISO 7638. They correspond here to plugs 29 which are inserted into the sockets 30*a*. The plug-in connector devices 64*a* are connected to a connecting line 74*a* via their second interfaces 68*a*. In comparison with the connecting line 26 for establishing a connection 22 according to ISO 7638, the connecting line 74*a* has at least one electrical line more. The data interface 70*a* of the plug-in connector device 64*a* arranged on the towing vehicle 12 is connected to an interface 75 of a control unit 76 via a data line 78 in order to transmit data 79, via the data interface 70*a*, to the plug-in connector device 64*a* and to receive data from the latter. The data 79 which are transmitted, for example, from the control unit 76 to the plug-in connector device 64*a* are output via the second interface 68*a* and, after transmission via the connecting line 74*a*, are received by the second interface 68*a* of the plug-in connector device 64*a* of the vehicle trailer 14. These received data 79 are then output via a data interface 70*a* of the plug-in connector device 64*a* of the vehicle trailer 14 and are output, for example as control signals, via a data line 84 for a sensor unit 80 which comprises a camera 82, for example. The sensor unit 80 then receives sensor signals, for example camera images, for example on the basis of the received control signals and in turn transmits them to the control unit 76 of the towing vehicle 12 via the data line 84 and the two plug-in connector devices 64*a*. At the same time, electrical signals 81 are also transmitted via the connecting line 74*a*, which electrical signals are also transmitted according to ISO 7638 in accordance with connection 22, as already explained while considering FIG. 2.

FIG. 3 also illustrates two further plug-in connector devices 64*b* according to one exemplary embodiment of the invention which likewise comprise a first interface 66*b*, a second interface 68*b* and a data interface 70*b*. The first interfaces 66*b* of the plug-in connector device 64*b* are formed as connecting elements 28 according to ISO 12098. These first interfaces 66*b* preferably correspond to plugs 29 which are inserted into the available sockets 30*b*. The data interface 70*b* of the plug-in connector device 64*b* of the towing vehicle 12 is connected to a further control unit 86 which is a control unit for advanced driver assistance systems (ADAS), for example. The further control unit 86 is therefore connected to further sensor units 88, 90 via the data interfaces 70*b* of the plug-in connector devices 64*b* and a connecting line 74*b* connecting the plug-in connector devices 64*b* order to interchange data 79. The electrical signals for controlling the lighting 62 which are prescribed according to ISO 12098 are additionally transmitted via the connecting line 74*b*, with the result that standardized signals, on the one hand, and data 79, on the other hand, can be interchanged at a high data rate between the further controller 86 and the sensor units 88 and 90.

The plug-in connector devices 64*a* and 64*b* are formed as adapters according to this exemplary embodiment since, as already stated above, they can be inserted into the corresponding sockets 30*a*, 30*b* which already present in a standardized manner on the vehicles 10.

Figure 4:
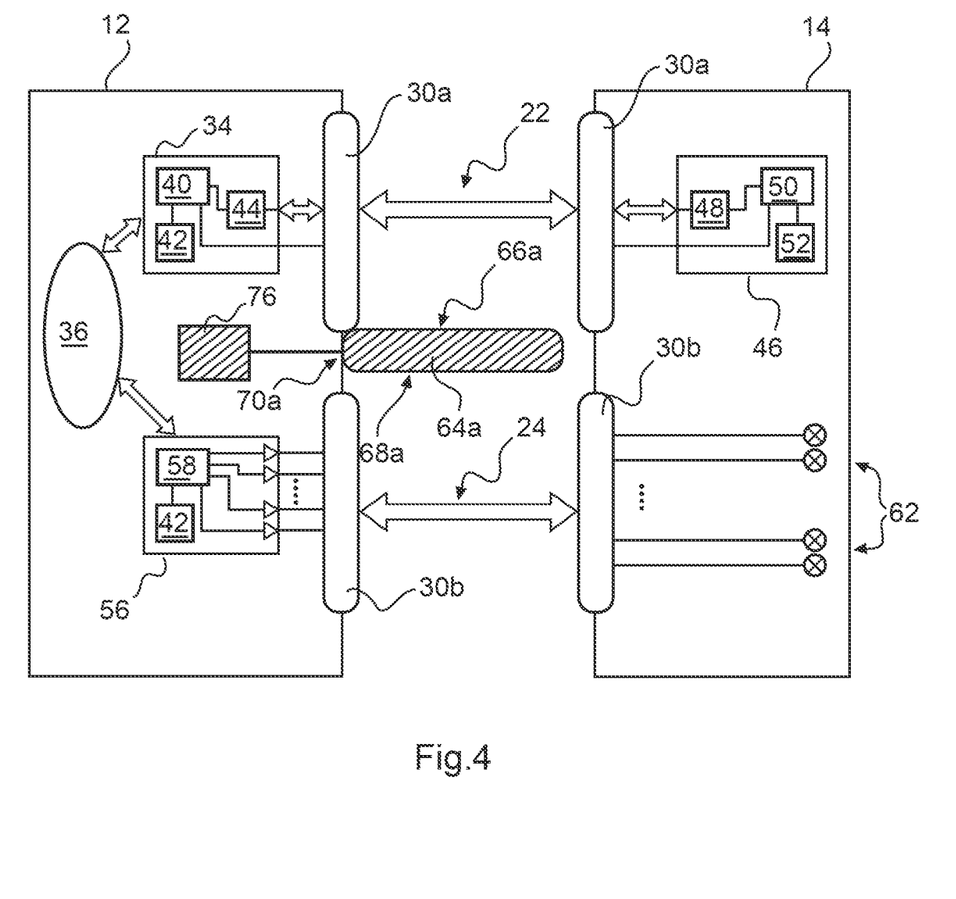

FIG. 4 shows the situation in which a towing vehicle 12, as illustrated in FIG. 3, is electrically connected to a vehicle trailer 14 according to the prior art, as illustrated in FIG. 2. In comparison with FIG. 3, FIG. 4 shows a towing vehicle 12 in which only one connection 22 according to ISO 7638 can be connected to a plug-in connector device 64a according to one exemplary embodiment of the invention. In order to establish a connection 22 according to ISO 7638, the plug-in connector device 64a, with its first interface 66a, was removed from the socket 30a according to ISO 7638. A standardized connection between the towing vehicle 12 and the vehicle trailer 14, as illustrated in FIG. 2, is therefore possible.

Figure 5:
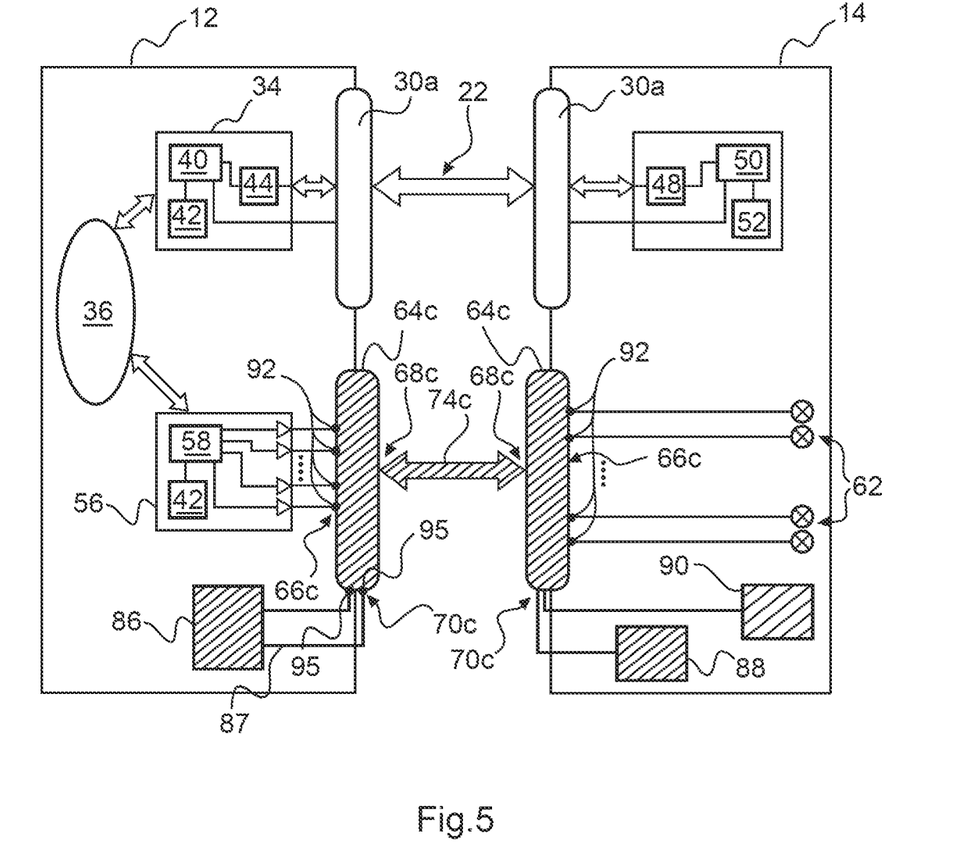

FIG. 5 shows a further exemplary embodiment of the invention having a plug-in connector device 64c. FIG. 5 again illustrates a towing vehicle 12 and a vehicle trailer 14. In this case, the towing vehicle 12 and the vehicle trailer 14 are electrically connected via a connection 22 according to ISO 7638, as also illustrated in FIG. 2. In contrast to FIG. 2, however, the towing vehicle 12 and the vehicle trailer 14 each have a plug-in connector device 64c which replace the sockets 30b in FIG. 2.

The plug-in connector devices 64c have a first interface 66c, a second interface 68c and a data interface 70c. The first interface 66c of the plug-in connector device 64c is formed with solder contacts 92 and the data interface 70c is formed with solder contacts 95 in FIG. 5. According to the exemplary embodiment in FIG. 5, the second interfaces 68c correspond to a connecting element 28 for establishing a connection according to ISO 12098. The second interfaces 68c are preferably formed as sockets 30c here. According to the illustration in FIG. 5, the second interfaces 68c are connected via a connecting line 74c which has, at its ends, connecting elements, specifically preferably plugs 29, which can be connected to the second interfaces 68c.

Figure 6:
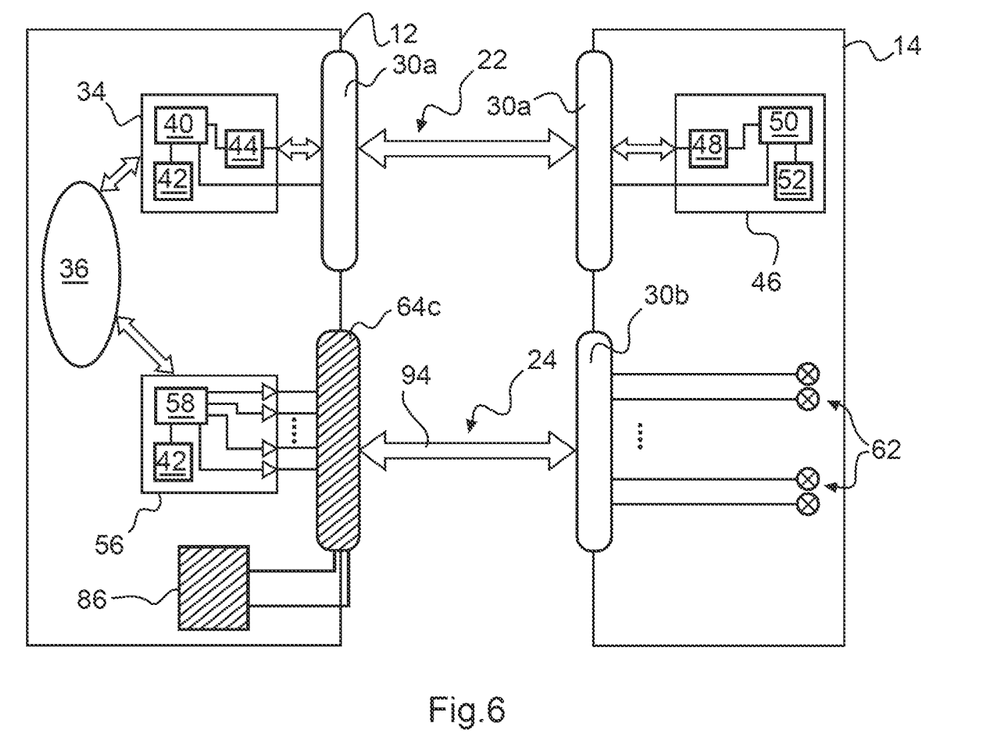

The connecting elements 28 of the second interfaces 68c are selected in this case in such a manner that, on the one hand, it is possible to insert a standardized connecting line 26 with standardized plugs 29 according to ISO 12098, wherein the illustrated connecting line 74c comprises at least one conductor more than a standardized ISO 12098 connecting line 26 and additional contacts are therefore provided, with which contact is made by contacts of the connecting elements 28 of the second interface 68c. The second interfaces 68c formed as connecting elements 28 therefore have, for example, an additional contact socket for receiving an additional contact pin with respect to the ISO 12098 standard or provide two contacts within a contact socket. As a result, it is then possible, as illustrated in FIG. 6, for a towing vehicle 12 according to the illustration in FIG. 5 to likewise be able to be connected, via a standardized connecting line 26 according to ISO 12098, to a vehicle trailer 14 which does not provide a plug-in connector device 64c according to the invention and therefore is not configured to interchange data 79.

Figure 7:
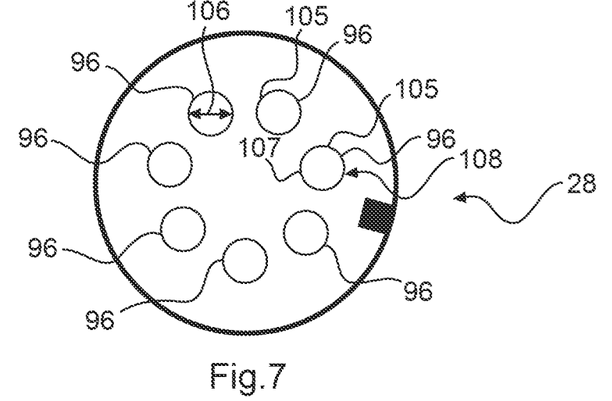
FIG. 7 shows a connecting element according to the prior art.

FIG. 7 shows a connecting element 28 for establishing a connection according to ISO 7638. Accordingly, the connecting element 28 has seven contacts 96 in order to be connected to seven complementary contacts of a further connecting element 28. A complementary contact is, for example, a contact pin if a contact is a contact socket and is, for example, a contact socket if a contact is a contact pin. For example, in the present case in FIG. 7, it is assumed that the contacts 96 are formed as contact pins 105. The contact pins 105 have a round cross section 106 and comprise an outer lateral surface 107. The outer lateral surface 107 forms an insertion region 108 for insertion in a contact socket.

Figure 8:
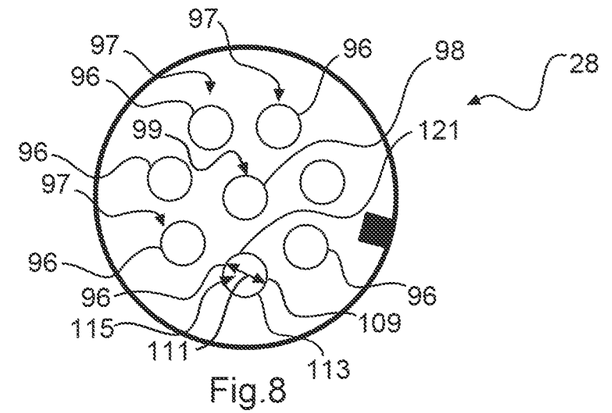
FIG. 8 shows a first exemplary embodiment of a connecting element according to one exemplary embodiment of the invention.

FIG. 8 shows a connecting element 28 according to the invention corresponding, for example, to the second interface 68c in FIG. 5. In comparison with FIG. 7, the contacts 96 at standardized positions 97 in FIG. 8 have an additional contact 98 which is arranged at a position 99 such that it does not affect the other contacts 96. If the connecting element 28 illustrated in FIG. 8 is formed as a socket, plugs according to ISO 7638 can be inserted into this socket without any problems. However, the contact 98 in the center remains without contact in this case. However, data 79 can be additionally transmitted with the aid of one of the already existing contacts 96 and the additional contact 98 using a special connecting line 74 which has a plug adapted to the connecting element 28 in FIG. 8. It is now assumed by way of example in FIG. 8 that the contacts 96 are formed as contact sockets 109. The contact sockets 109 have a round cross section 111 and comprise an inner lateral surface 113. The inner lateral surface 113 forms a receiving region 115 for receiving the insertion region 108 of contacts 96 formed as contact pins 105.

Figure 9:
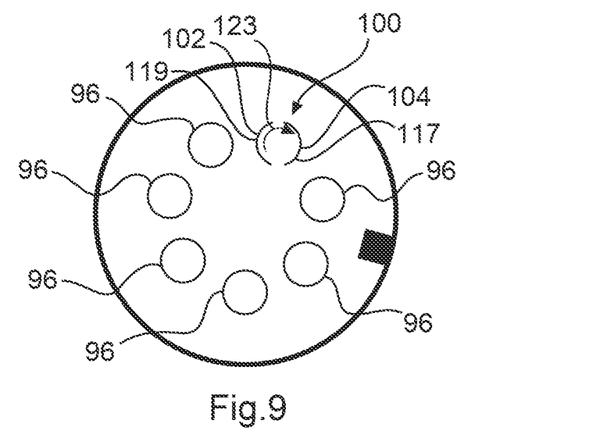
FIG. 9 shows a further exemplary embodiment of a connecting element.

FIG. 9 shows an alternative design of the connecting element 28 according to the invention, in which case contacts 96 which serve the standardized contacts for establishing a connection according to ISO 7638 are likewise shown here. However, a contact 100 is divided into two individual contact areas 102 and 104 which are electrically isolated from one another. If a conventional connecting element 28 according to ISO 7638 is therefore connected to the connecting element 28 illustrated in FIG. 9, the two contact areas 102 and 104 are bridged and a conventional ISO 7638 connection can be established. However, data 79 can be additionally transmitted via the contact 100 using a special connecting line 76 which has a corresponding connecting element having contact areas which are likewise isolated and are intended to be connected to the contact 100. The contact areas 102, 104 are formed as partial lateral surfaces 117, 119 of a cylindrical lateral surface 107, 113 which are beside one another in the circumferential direction 123 of a circle 121 formed by the cross section 106, 111 of the lateral surface 107, 113.

Figure 10:
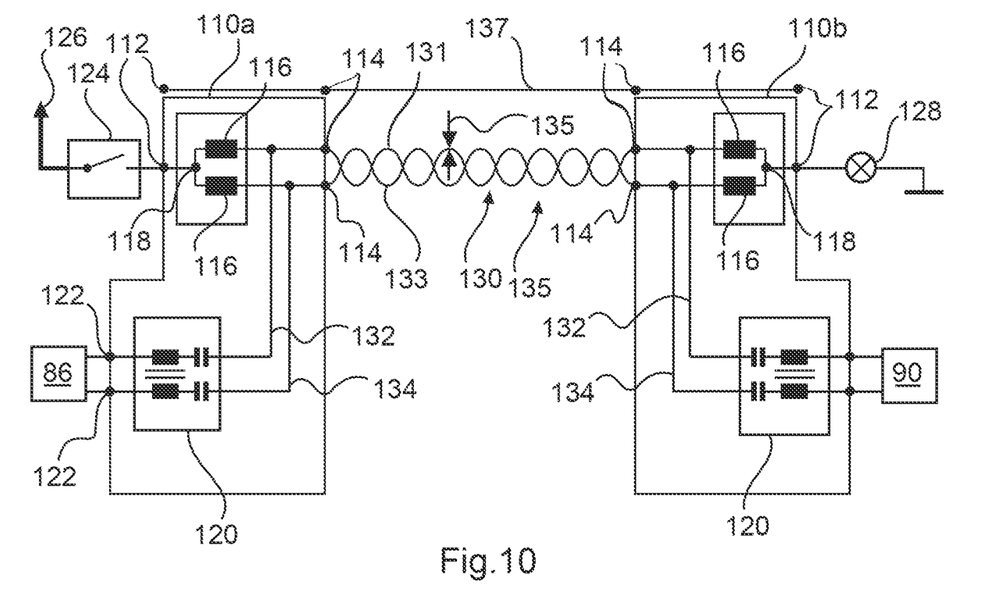
FIG. 10 shows a substructure of two plug-in connector devices which are connected to one another.

FIG. 10 shows a section of an electrical connection between a towing vehicle 12 and a vehicle trailer 14 for transmitting an individual signal 81 according to ISO 7638 or ISO 12098 and for simultaneous data transmission at a high data rate. A branching element 110a which is part of the plug-in connector device 64a, 64b, 64c is illustrated for this purpose. The branching element 110a has a first contact 112, which is part of the first interface 66a, 66b, 66c, and two second contacts 114 which are part of the second interface 68a, 68b, 68c. The second contacts 114 are each connected to a connecting point 118 via a filter element 116. The connecting point 118 is also connected to the first contact 112. In addition, the second contacts 114 are connected to third contacts 122 via a further filter device 120, wherein the third contacts 122 are part of the data interface 70a, 70b, 70c. A control unit 86 of the towing vehicle 12 is connected, by way of example, to the third contacts 122 of the second data interface.

The branching element 110a is part of a plug-in connector device of a towing vehicle 12. The first contact 112 is connected, for example, to a light control unit which opens or closes the illustrated switch 124 following a request from a driver. In the closed state, a voltage 126, for example 24 V, is provided, for example, for a lighting means 128 in the vehicle trailer 14. The voltage 126 is supplied to a further plug-in connector device 64a, 64b, 64c via the filter elements 116 and a twisted line 130 having two twisted conductors 131, 133 which is part of a connecting line 135 having further conductors 137. The conductors 131, 133 of the twisted line 130 have a smaller cross section 135 than the further conductors 137. A branching element 110b is likewise arranged in the further plug-in connector device and, for the sake of better clarity, is illustrated here in a manner detached from the plug-in connector device, like the branching element 110a as well. The forwarded voltage 126 is passed to the lighting means 128 via the filter elements 116 and a further connecting point 118 of the branching element 110b. At the same time, data 79 are modulated onto the twisted line 130 via the controller 86 and the data interface 70. The two connections 132, 134 are used, for example, to transmit a differential line code, specifically with an opposite polarity change, for example. The further filter device 120 is therefore used to filter out DC voltage components for supplying the lighting means 128 which are transmitted via the twisted line 130, while the filters 116 are used to remove the modulated oscillations. Therefore, a standardized ISO 7638 or ISO 12098 signal, on the one hand, and a data transmission, on the other hand, can be simultaneously effected via the twisted line 130.

Figure 11:
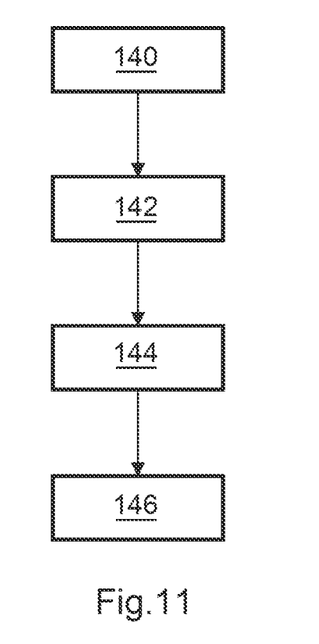
FIG. 11 shows the steps of an exemplary embodiment of the method.

FIG. 11 describes the steps of the method according to one exemplary embodiment. In a step 140, data 79 are provided at a third interface 70a, 70b, 70c of a plug-in connector device 64a, 64b, 64c according to the invention and, in a step 142, the data 79 are emitted at a second interface 68a, 68b, 68c of a plug-in connector device according to the invention. In step 144, data 79 are received at a second interface 68a, 68b, 68c of a further plug-in connector device 64a, 64b, 64c according to the invention and are provided at a data interface 70a, 70b, 70c of the further plug-in connector device 64a, 64b, 64c in a step 146.

What is claimed is:

1. A plug-in connector device (64, 64a, 64b, 64c) for a vehicle (10), in particular a towing vehicle (12) or a vehicle trailer (14), for transmitting data, comprising:
a first interface (66, 66a, 66b, 66c) for connection to a vehicle (10),
a second interface (68, 68a, 68b, 68c) for connection to a connecting line (26, 74a, 74b, 74c, 137),
wherein at least one of the first interface (66, 66a, 66b, 66c) and the second interface (68, 68a, 68b, 68c) is a connecting element (28) for establishing a connection (22, 24) according to an ISO or SAE standard, in particular a connection (22) according to ISO 7638 or a connection (24) according to ISO 12098,
a data interface (70, 70a, 70b, 70c) for connection to a data line (78, 84) of the vehicle (10),
wherein the data interface (70, 70a, 70b, 70c) is electrically connected to the first interface (66, 66a, 66b, 66c) to transmit electrical signals (81) or data (79) between the data interface (70, 70a, 70b, 70c) and the second interface (68, 68a, 68b, 68c), and
wherein the first interface (66, 66a, 66b, 66c) is electrically connected to the second interface (68, 68a, 68b, 68c) to transmit the electrical signals (81) or data (79) between the first interface (66, 66a, 66b, 66c) and the second interface (68, 68a, 68b, 68c),
wherein the first interface (66, 66a, 66b, 66c) has a plurality of first contacts (112),
wherein the second interface (68, 68a, 68b, 68c) has a plurality of second contacts (114),
wherein the first contacts (112) of the first interface (66, 66a, 66b, 66c) are solder contacts (92) for permanent connection to lines (60a to 60c) of a vehicle (10), and the second contacts (114) are formed as the connecting element (28) for establishing a connection (22) according to ISO 7638 or a connection (24) according to ISO 12098,
wherein the second contacts (98) are formed as contact areas (102, 104) in contact sockets or formed as contact pins, wherein at least one of the contact sockets or one of the contact pins has two electrically isolated contact areas (102, 104).

2. The plug-in connector device (64, 64a, 64b, 64c) as claimed in claim 1, wherein
the data interface (70, 70a, 70b, 70c) has a plurality of third contacts (122), and
wherein the plug-in connector device (64, 64a, 64b, 64c) further has at least one branching element (110, 110a, 110b) with a connecting point (118) and at least two filter elements (116),
wherein one of the first contacts (112) is connected to the connecting point (118) and two of the second contacts (114) are respectively electrically connected to the connecting point (118) via two of the filter elements (116), wherein two of the third contacts (122) are also respectively connected to the two second contacts (114).

3. The plug-in connector device (64, 64a, 64b, 64c) as claimed in claim 2, wherein the at least one branching element comprises at least two branching elements (110, 110a, 110b).

4. A plug-in connector device (64, 64a, 64b, 64c) for a vehicle (10), in particular a towing vehicle (12) or a vehicle trailer (14), for transmitting data, comprising:
a first interface (66, 66a, 66b, 66c) for connection to a vehicle (10),
a second interface (68, 68a, 68b, 68c) for connection to a connecting line (26, 74a, 74b, 74c, 137),
wherein at least one of the first interface (66, 66a, 66b, 66c) and the second interface (68, 68a, 68b, 68c) is a connecting element (28) for establishing a connection (22, 24) according to an ISO or SAE standard, in particular a connection (22) according to ISO 7638 or a connection (24) according to ISO 12098,
a data interface (70, 70a, 70b, 70c) for connection to a data line (78, 84) of the vehicle (10),
wherein the data interface (70, 70a, 70b, 70c) is electrically connected to the first interface (66, 66a, 66b, 66c) to transmit electrical signals (81) or data (79) between the data interface (70, 70a, 70b, 70c) and the second interface (68, 68a, 68b, 68c), and
wherein the first interface (66, 66a, 66b, 66c) is electrically connected to the second interface (68, 68a, 68b, 68c) to transmit the electrical signals (81) or data (79) between the first interface (66, 66a, 66b, 66c) and the second interface (68, 68a, 68b, 68c),
wherein the first interface (66, 66a, 66b, 66c) has a plurality of first contacts (112),
wherein the second interface (68, 68a, 68b, 68c) has a plurality of second contacts (114),
wherein the first contacts (112) of the first interface (66, 66a, 66b, 66c) are solder contacts (92) for permanent connection to lines (60a to 60c) of a vehicle (10), and the second contacts (114) are formed as a connecting element (28) for establishing a connection (22) according to ISO 7638 or a connection (24) according to ISO 12098,
wherein the second interface (68, 68a, 68b, 68c) has at least one further second contact (98) which, in the connecting element (28) formed by the second interface (68, 68a, 68b, 68c), has a position (99) which differs from positions (97) of the contacts (96) prescribed according to ISO 7638 or ISO 12098, with the result that contacts (96) which are prescribed according to ISO 7638 or ISO 12098, remain unaffected by the at least one further second contact (98).

5. The plug-in connector device (64, 64a, 64b, 64c) as claimed in claim 1, wherein the data interface (70, 70a, 70b, 70c) has a plurality of third contacts (122), wherein the third contacts (95) are formed as solder contacts (92) for the permanent connection of electrical lines (87) of a vehicle (10).

6. A plug-in connector device (64, 64a, 64b, 64c) as claimed in claim 1,
wherein the contact sockets (109), each have a receiving region (115) for receiving a contact pin (105), wherein at least one of the contact sockets (109) has the electrically isolated contact areas (102, 104), or
wherein the contact pins (105), each have an insertion region (108) for insertion into a receiving region (115) of a contact socket (109), wherein at least one of the contact pins (105) has the electrically isolated contact areas (102, 104).

7. The plug-in connector device (64, 64a, 64b, 64c) as claimed in claim 6,
wherein the receiving region (115) of the contact sockets (109) is cylindrical with an inner lateral surface (113), wherein the electrically isolated contact areas (102, 104) of the contact sockets (109) are formed with at least two partial lateral surfaces (117, 119) which are beside one another in the circumferential direction (123) of the inner lateral surface (113), or
wherein the insertion region (108) of the contact pins (105) is cylindrical with an outer lateral surface (107), wherein the electrically isolated contact areas (102, 104) of the at least one contact pin (105) are formed with at least two partial lateral surfaces (117, 119) which are beside one another in a circumferential direction (123) of the outer lateral surface (107).

8. A connecting line (74, 74a, 74b, 74c, 137) comprising:
at least one further connecting element (28) for connection to the second interface (68, 68a, 68b, 68c) of the plug-in connector device (64, 64a, 64b, 64c) as claimed in claim 1,
wherein the connecting line (74, 74a, 74b, 74c, 137) has a plurality of electrical conductors (131, 133) and wherein at least one pair of conductors (131, 133) is twisted.

9. The connecting line (74, 74a, 74b, 74c, 137) as claimed in claim 8, wherein the pair of twisted lines (131, 133) complies with the Open Alliance BroadR-Reach (O-ABR) standard.

10. The connecting line (74, 74a, 74b, 74c, 137) as claimed in claim 8, wherein the conductors (131, 133) of the at least one pair of twisted conductors (131, 133) have a smaller cross section (135) than the untwisted lines (137), in particular substantially half the cross section (135).

11. The connecting line (74, 74a, 74b, 74c, 137) as claimed in claim 8, wherein the connecting line (74, 74a, 74b, 74c, 137) has the at least one connecting element (28) formed as a plug (29) with the contact pins (96, 100), wherein at least one of the contact pins (96, 100) has the two isolated contact areas (102, 104) each of which is respectively connected to one of the conductors (131, 133) of the pair of twisted conductors (131, 133).

12. A system comprising: the plug-in connector device (64, 64a, 64b, 64c) as claimed in claim 1, and
a control unit (86, 76, 80, 88, 90) including at least one of a sensor unit (80, 88, 90), a camera (82), and an evaluation unit (86),
wherein an interface (75) of the control unit (76, 86, 80, 88, 90) is connected to the data interface (70, 70a, 70b, 70c) of the plug-in connector element (64, 64a, 64b, 64c).

13. A vehicle (10) comprising the system as claimed in claim 12.

14. A method for transmitting data (79) between two vehicles (12), the method comprising the steps of:
providing (140) data (79) at a data interface (70, 70a, 70b, 70c) of the plug-in connector device (64, 64a, 64b, 64c) as claimed in claim 1,
emitting (142) the provided data (79) at the second interface (68, 68a, 68b, 68c) of the plug-in connector device (64, 64a, 64b, 64c),
receiving (144) the emitted data (79) at a further second interface (68, 68a, 68b, 68c) of a further plug-in connector device (64, 64a, 64b, 64c), and
providing (146) the received data (79) at a further data interface (70, 70a, 70b, 70c) of the further plug-in connector device (64, 64a, 64b, 64c).

15. The plug-in connector device (64, 64a, 64b, 64c) as claimed in claim 1, wherein the connecting element (28) is a plug (29) or a socket (30) for establishing a connection (22) according to ISO 7638 or a connection (24) according to ISO 12098.

16. The plug-in connector device (64, 64a, 64b, 64c) as claimed in claim 2, wherein the two of the third contacts (122) are respectively connected to the two second contacts (114) via respective filter devices (120).

17. A plug-in connector device (64, 64a, 64b, 64c) for a vehicle (10), in particular a towing vehicle (12) or a vehicle trailer (14), for transmitting data, comprising:
a first interface (66, 66a, 66b, 66c) for connection to a vehicle (10),
a second interface (68, 68a, 68b, 68c) for connection to a connecting line (26, 74a, 74b, 74c, 137),
wherein at least one of the first interface (66, 66a, 66b, 66c) and the second interface (68, 68a, 68b, 68c) is a connecting element (28) for establishing a connection (22, 24) according to an ISO or SAE standard, in particular a connection (22) according to ISO 7638 or a connection (24) according to ISO 12098,
a data interface (70, 70a, 70b, 70c) for connection to a data line (78, 84) of the vehicle (10),
wherein the data interface (70, 70a, 70b, 70c) is electrically connected to the first interface (66, 66a, 66b, 66c) to transmit electrical signals (81) or data (79) between the data interface (70, 70a, 70b, 70c) and the second interface (68, 68a, 68b, 68c), and
wherein the first interface (66, 66a, 66b, 66c) is electrically connected to the second interface (68, 68a, 68b, 68c) to transmit the electrical signals (81) or data (79) between the first interface (66, 66a, 66b, 66c) and the second interface (68, 68a, 68b, 68c),
wherein the first interface (66, 66a, 66b, 66c) has a plurality of first contacts (112),
wherein the second interface (68, 68a, 68b, 68c) has a plurality of second contacts (114),
wherein the second contacts (98) are formed as contact areas (102, 104) in contact sockets or formed as contact pins, wherein at least one of the contact sockets or one of the contact pins has two electrically isolated contact areas (102, 104).

18. The plug-in connector device (64, 64a, 64b, 64c) as claimed in claim 17, wherein the first interface (66, 66a, 66b, 66c) is a connecting element (28) for establishing a connection according (22) to ISO 7638 or a connection (24)

according to ISO 12098, and the second interface (68, 68*a*, 68*b*, 68*c*) is formed as a proprietary connecting element (28).

\* \* \* \* \*